(12) United States Patent
Critchley

(10) Patent No.: US 8,164,865 B2
(45) Date of Patent: Apr. 24, 2012

(54) SYSTEM AND METHOD FOR QUICKLY DISCHARGING A DC RELAY

(75) Inventor: Malcolm J. Critchley, Scottsdale, AZ (US)

(73) Assignee: Leach International Corporation, Buena Park, CA (US)

( * ) Notice: Subject to any disclaimer, the term of this patent is extended or adjusted under 35 U.S.C. 154(b) by 355 days.

(21) Appl. No.: 12/432,655

(22) Filed: Apr. 29, 2009

(65) Prior Publication Data

US 2009/0284879 A1    Nov. 19, 2009

Related U.S. Application Data

(60) Provisional application No. 61/048,936, filed on Apr. 29, 2008.

(51) Int. Cl.
*H02H 7/00* (2006.01)
(52) U.S. Cl. .................................. 361/2; 361/8
(58) Field of Classification Search .............. 361/2, 139, 361/160, 56, 111, 8
See application file for complete search history.

(56) References Cited

U.S. PATENT DOCUMENTS

| | | | |
|---|---|---|---|
| 4,224,654 A | 9/1980 | Goldthorp et al. | |
| 4,227,231 A * | 10/1980 | Hansen et al. | 361/154 |
| 4,274,122 A | 6/1981 | Hansen et al. | |
| 4,649,286 A | 3/1987 | Takeda et al. | |
| 4,658,320 A | 4/1987 | Hongel | |
| 4,688,138 A | 8/1987 | Nagata et al. | |
| 5,055,961 A | 10/1991 | Wiblin et al. | |
| 5,539,820 A | 7/1996 | Pistilli | |
| 5,652,688 A * | 7/1997 | Lee | 361/13 |
| 6,493,204 B1 | 12/2002 | Glidden et al. | |
| 6,600,239 B2 | 7/2003 | Winick et al. | |
| 2001/0026431 A1 * | 10/2001 | Mechanic | 361/111 |
| 2003/0063418 A1 * | 4/2003 | Bergh et al. | 361/51 |
| 2004/0155638 A1 * | 8/2004 | Flaherty | 323/282 |

OTHER PUBLICATIONS

Declaration of sole inventor, Malcolm J. Critchley, pertaining to U.S. Appl. No. 12/432,655; Declaration dated May 4, 2009; 4 pages.
Declaration of an employee of Leach International Corporation, Randy Louwsma, pertaining to U.S. Appl. No. 12/432,655; Declaration dated May 15, 2009; 6 pages.

* cited by examiner

*Primary Examiner* — Danny Nguyen
(74) *Attorney, Agent, or Firm* — Christie, Parker & Hale, LLP

(57) ABSTRACT

A system and method for quickly discharging a DC relay is provided. In one embodiment, the invention relates to circuit for discharging a relay coil, the circuit including a first suppression circuit coupled across a control power source, a switch, a relay coil in series with the switch, wherein the relay coil and the switch are coupled across the control power source, and a second suppression circuit coupled across the relay coil, wherein the relay coil is configured to actuate at least one load switch when sufficiently energized by the control power source, wherein the first suppression circuit is configured to discharge energy stored in the relay coil, and wherein the second suppression circuit is configured to discharge energy stored in the relay coil.

21 Claims, 6 Drawing Sheets

| RELAY TYPE | FAST RELEASE RELAY (FRR) SWITCH TIME | TYPICAL RELAY SWITCH TIME | TYPICAL RELAY RELEASE TIME | FRR RELEASE TIME | IMPROVEMENT |
|---|---|---|---|---|---|
| 1. DC | 32 | 26 | 10.2 | 5 | 5.2  - ~50% |
| 2. DC | 35 | 29 | 10 | 5 | 5  - 50% |
| 3. DC | 12 | 6 | 7 | 5.5 | 1.5  - 20% |
| 4. DC | 17 | 11 | 7.4 | 4.5 | 2.9  - 40% |
| 5. DC | 12.5 | 6.5 | 6 | 4.5 | 1.5  - 25% |
| 6. DC | 23 | 17 | 5 | 2.3 | 2.7  - 54% |
| 7. DC | 15.3 | 10.3 | 4.6 | 4.6 | 0  - 0% |
| 8. AC | 32 | 12 | 34 | 6 | 28  - ~500% |
| 9. AC | 36 | 19 | 8 | 3.5 | 4.5  - 56% |
| 3. DC psu ~5ms | | | | | |
| 8. AC psu ~20ms | | | | | |
| 9. AC psu ~17ms | | | | | |

SYSTEM AND METHOD FOR QUICKLY DISCHARGING A DC RELAY

CROSS REFERENCE TO RELATED APPLICATIONS

The present application claims the benefit of Provisional Application No. 61/048,936, filed Apr. 29, 2008, entitled "SYSTEM AND METHOD FOR QUICKLY DISCHARGING A DC RELAY", the entire content of which is incorporated herein by reference.

BACKGROUND TO THE INVENTION

The present invention relates generally to a system and method for quickly discharging a direct current (DC) relay. More specifically, the present invention relates to a system for minimizing the amount of time expended in discharging a direct current (DC) relay coil that was charged using a DC power source.

Relay coils are inductors and oppose changes in current flow. DC coils are often used within a DC relay to generate a switching force capable of actuating one or more load switches. In such case, a DC voltage is applied to a DC coil which stores the applied energy and generates the switching force. Once a voltage or energy threshold has been met, load switches are actuated by the switching force of the DC coil. As the supply voltage to the coil is disconnected, high voltages are generated due to the energy stored in the coil. Such high voltages can damage control logic, power sources and switch contacts. The energy stored in the DC coil is dissipated over a period of time. However, that period of time can be substantial.

SUMMARY OF THE INVENTION

Aspects of the invention relate to a system and method for quickly discharging a DC relay. In one embodiment, the invention relates to circuit for discharging a relay coil, the circuit including a first suppression circuit coupled across a control power source, a switch, a relay coil in series with the switch, wherein the relay coil and the switch are coupled across the control power source, and a second suppression circuit coupled across the relay coil, wherein the relay coil is configured to actuate at least one load switch when sufficiently energized by the control power source, wherein the first suppression circuit is configured to discharge energy stored in the relay coil, and wherein the second suppression circuit is configured to discharge energy stored in the relay coil.

In another embodiment, the invention relates to a circuit for discharging a relay coil, the circuit including a control power source, a first switch in series with the control power source, a first parallel subcircuit in parallel with the control power source and the first switch, the first parallel subcircuit including a first diode in series with a first zener diode, a second parallel subcircuit in parallel with the control power source and the first switch, the second parallel subcircuit including a MOSFET switch in series with a relay coil, and a third parallel subcircuit in parallel with the relay coil, the third parallel subcircuit including a second diode in series with a second zener diode, wherein the relay coil is configured to actuate at least one load switch when sufficiently energized by the control power source.

BRIEF DESCRIPTION OF THE DRAWINGS

FIG. 6 is a table illustrating performance characteristics associated with use of a fast release circuit in accordance with an embodiment of the present invention.

DETAILED DESCRIPTION OF THE INVENTION

Figure 1:
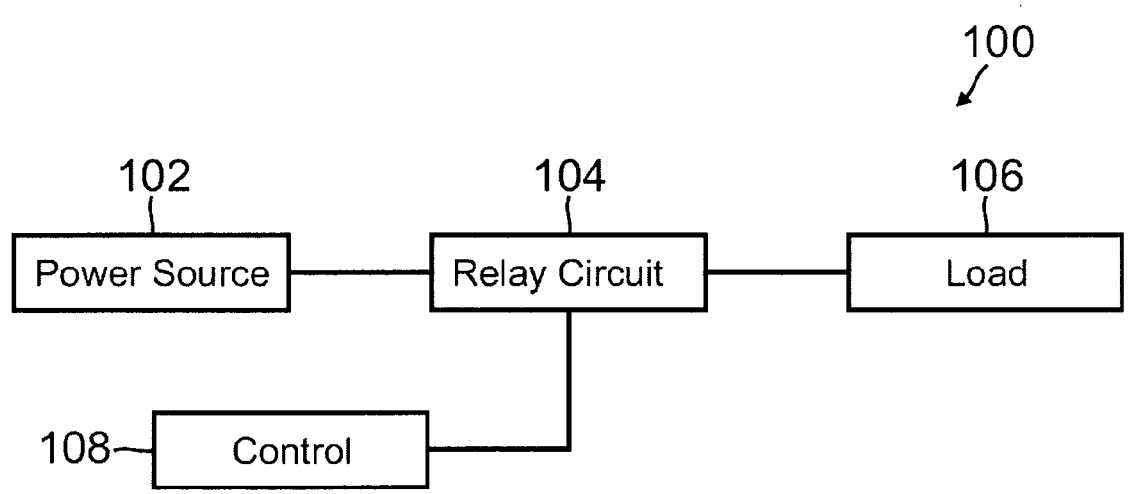
FIG. 1 is a schematic block diagram of a power control system including a DC relay circuit in accordance with an embodiment of the present invention.

Turning now to the drawings, embodiments of systems and methods for quickly discharging a DC relay are illustrated. The DC relays generally include DC coils that provide a switching force to actuate one or more load switches when sufficient voltage is applied by a DC control power source. When the power source is disconnected to return the load switches their original switch positions, the fast release circuits isolate the DC coils and quickly dissipate the energy stored in the DC coils. In several embodiments, the fast release circuit includes a switch in series with a DC coil and a suppression circuit including a conventional diode in series with a zener diode, where the suppression circuit is coupled in parallel across the DC coil.

In some embodiments, the fast release circuits are used in conjunction with legacy circuits designed to dissipate energy stored in a DC coil. However, the legacy circuits are often designed without consideration to the time period from the removal of the voltage provided by a DC control power source to the actuation of the one or more load switches (e.g., release time). In some embodiments, the legacy circuits include a diode in series with a zener diode. In many embodiments, the operation of the legacy circuits results a release time that is too long for a number of applications. In particular, applications involving switching power distribution systems in an airplane can require very short or minimal release time. In some cases, excessive release times can result in system failure within an airplane. In one embodiment, for example, a release time of 20 milliseconds (ms) or more is too long. Using the fast release circuit, the release time can be substantially reduced. In one embodiment, for example, the release time can be reduced to 10 ms or less. In another embodiment, the release time is reduced by up to 50 percent.

In several embodiments, the DC relays having a fast release circuit can be used to control the distribution of power in an aircraft electrical system. Power can be distributed using DC or AC (single, two or three phase) systems, or combinations thereof. In a number of embodiments, the DC relay has one load switch that switches an AC or DC power source. In several embodiments, the DC power sources operate at 28 volts, 26 volts or 270 volts. In one embodiment, DC power sources operate in the range of 11 to 28 volts. In other embodiments, the DC relay includes three load switches that switch different phases of an AC power source. In one embodiment, the AC power source operates at 115 volts and at a frequency of 400 hertz. In other embodiments, the DC relays having a fast release circuit have more than a single load switch where each load switch can switch a DC power source or a single phase of an AC power source. In other embodiments, the power sources operate at other voltages and other frequencies. In one embodiment, the DC power sources can include batteries, auxiliary power units and/or external DC power sources. In one embodiment, the AC power sources can include generators, ram air turbines and/or external AC power sources.

A related fast release circuit is described in U.S. patent application Ser. No. 12/431,682, filed Apr. 28, 2009, entitled "SYSTEM AND METHOD FOR QUICKLY DISCHARGING AN AC RELAY", now U.S. Pat. No. 8,116,059, the entire content of which is incorporated herein by reference.

FIG. 1 is a schematic block diagram of a power control system 100 including a DC relay circuit 104 in accordance with an embodiment of the present invention. The power control system 100 includes a power source 102 coupled to the relay circuit 104. The relay circuit 104 is also coupled to a load 106 and a control circuit 108.

In operation, the relay circuit 104 controls the flow of current from the power source 102 to the load 106 based on input received from the control circuit 108. In one embodiment, the power source is an AC power source used in an aircraft. In such case, the load is an aircraft load such as, for example, aircraft lighting or aircraft heating and cooling systems. In several embodiments, the relay circuit 104 includes a DC coil and a fast release circuit. The fast release circuit can isolate the DC coil and quickly dissipate the energy stored in the DC coil when power provided from the control circuit 108 is disconnected or removed.

Figure 2:
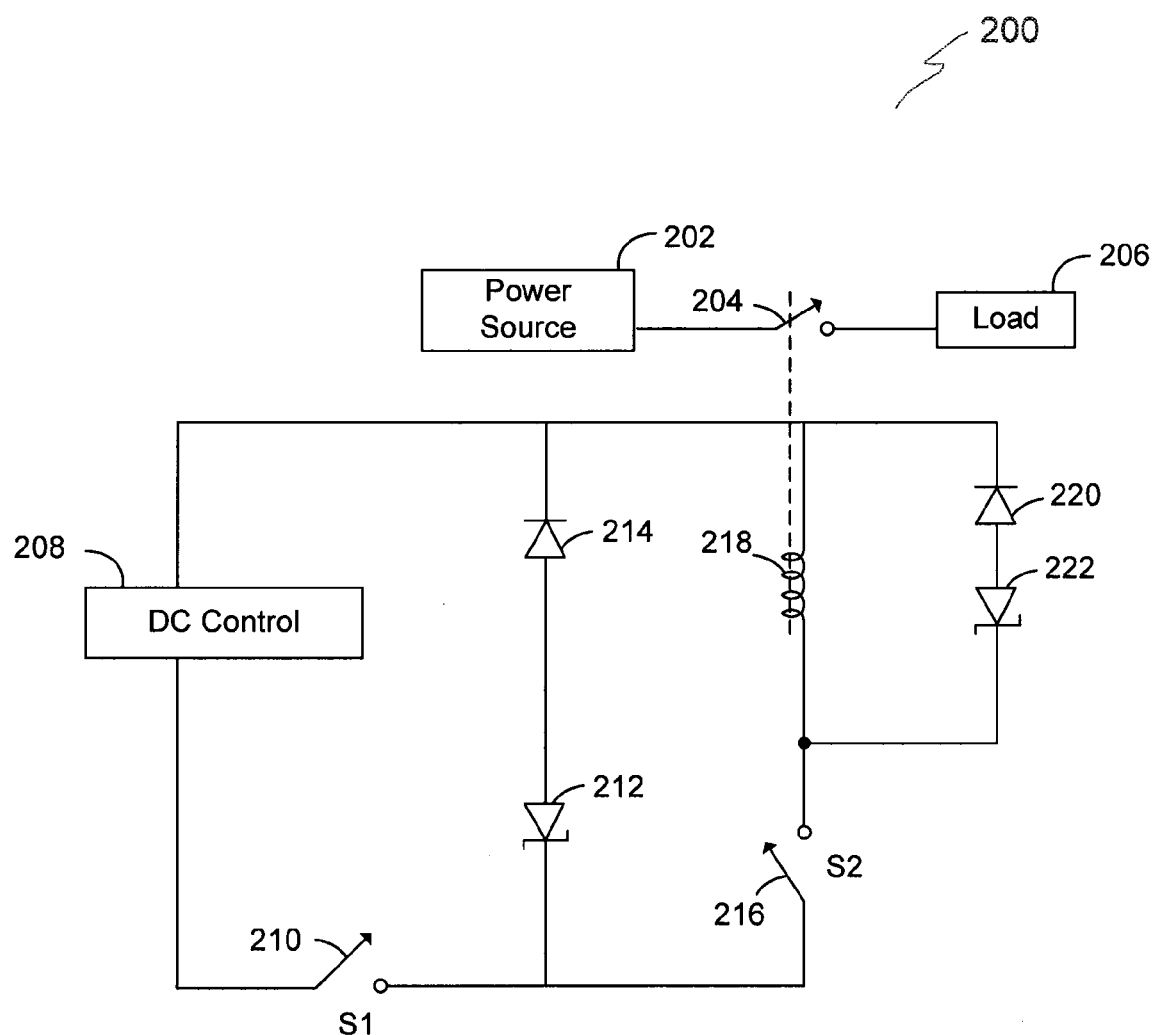
FIG. 2 is a schematic diagram of a DC relay circuit including a fast release circuit in accordance with an embodiment of the present invention.

FIG. 2 is a schematic diagram of a DC relay circuit 200 including a fast release circuit in accordance with an embodiment of the present invention. The DC relay circuit further includes a power source 202 coupled with a load switch 204. The position of the load switch 204 is controlled by a switching force generated in a DC coil 218. The load switch 204 is also coupled to a load 206.

A DC control power source 208 is coupled by a first switch 210 to a legacy suppression circuit including a zener diode 212 in series with a diode 214. The cathode of zener diode 212 is coupled to the first switch 210, while the anode of zener diode 212 is coupled to the anode of diode 214. Thus, the zener diode 212 and the diode 214 are effectively in a back to back configuration. A fast release circuit is coupled in parallel with the legacy circuit. The fast release circuit includes a second switch 216 in series with the DC coil 218 and a second suppression circuit including a second diode 220 in series with a second zener diode 222. The second suppression circuit is in parallel with the DC coil 218. In the illustrated embodiment, the second diode 220 and zener diode 222 are in a back to back configuration (e.g., the anodes of each diode are coupled together). In another embodiment, the second diode 220 and zener diode 222 are in another configuration (e.g., the cathodes of each diode are coupled together). The second switch 216 is in series with DC coil 218. The second switch 216 is coupled to the first switch 210, and the DC coil 218 is coupled to the DC control power source 208. The second diode 220 is also coupled to the DC control power source 208.

In operation, the first switch 210 and the second switch 216 are closed and the DC coil 218 is charged by the DC control source 208. Once the DC coil is sufficiently charged, it generates a switching force to actuate the load switch 204. The first switch 210 can then be opened to disconnect the DC control source. The second switch can be opened to isolate the DC coil from the legacy circuit and DC control source. The DC coil generates a back electromotive force (EMF) which is dissipated in the second suppression circuit including the zener diode 222 and diode 220.

When the back EMF reaches a predetermined level, the zener diode 222 allows current to flow in reverse direction through the zener diode and thus also through the diode 220. In such case, both diodes dissipate energy as current flows through both diodes and returns to the DC coil. This dissipation cycle can repeat until the DC coil is fully discharged. In some embodiments, the DC coil is discharged in a single cycle. In several embodiments, the value of the zener diode, the zener or breakdown voltage, is chosen to enable a particular release time.

In one embodiment, the first zener diode has a breakdown or zener voltage of 39 volts. In one embodiment, the second zener diode has a breakdown voltage of 200 volts. In several embodiments, the first switch is designed to handle a voltage of 28 volts. In such case, back EMFs greater than 28 volts can cause arcing across the first switch. In one embodiment, the second switch is designed to handle a voltage of up to 500 volts. In such case, back EMFs greater than 500 volts can cause arcing across the switch. In a number of embodiments, the value of the second zener diode is selected such that it is less than the arcing voltage of the second switch. In one such case, the second zener diode has a value of 200 volts while the second switch has an arcing voltage of 500 volts. In other embodiments, other breakthrough voltage values can be used for the zener diodes and switches having other arcing voltage characteristics can be used.

In one embodiment, the fast release circuit is not isolated with the DC coil and both the legacy suppression circuit and fast release circuit operate to discharge energy stored in the DC coil. In such case, the relay circuit effective acts in a non-fast release mode. In this case, most or all of the energy stored in the coil will be dissipated in the legacy circuit as it often has a zener diode with a lower breakdown voltage. Thus, the zener of the legacy circuit would conduct before the back EMF rises to level at which the zener of the fast release would conduct.

Figure 3:
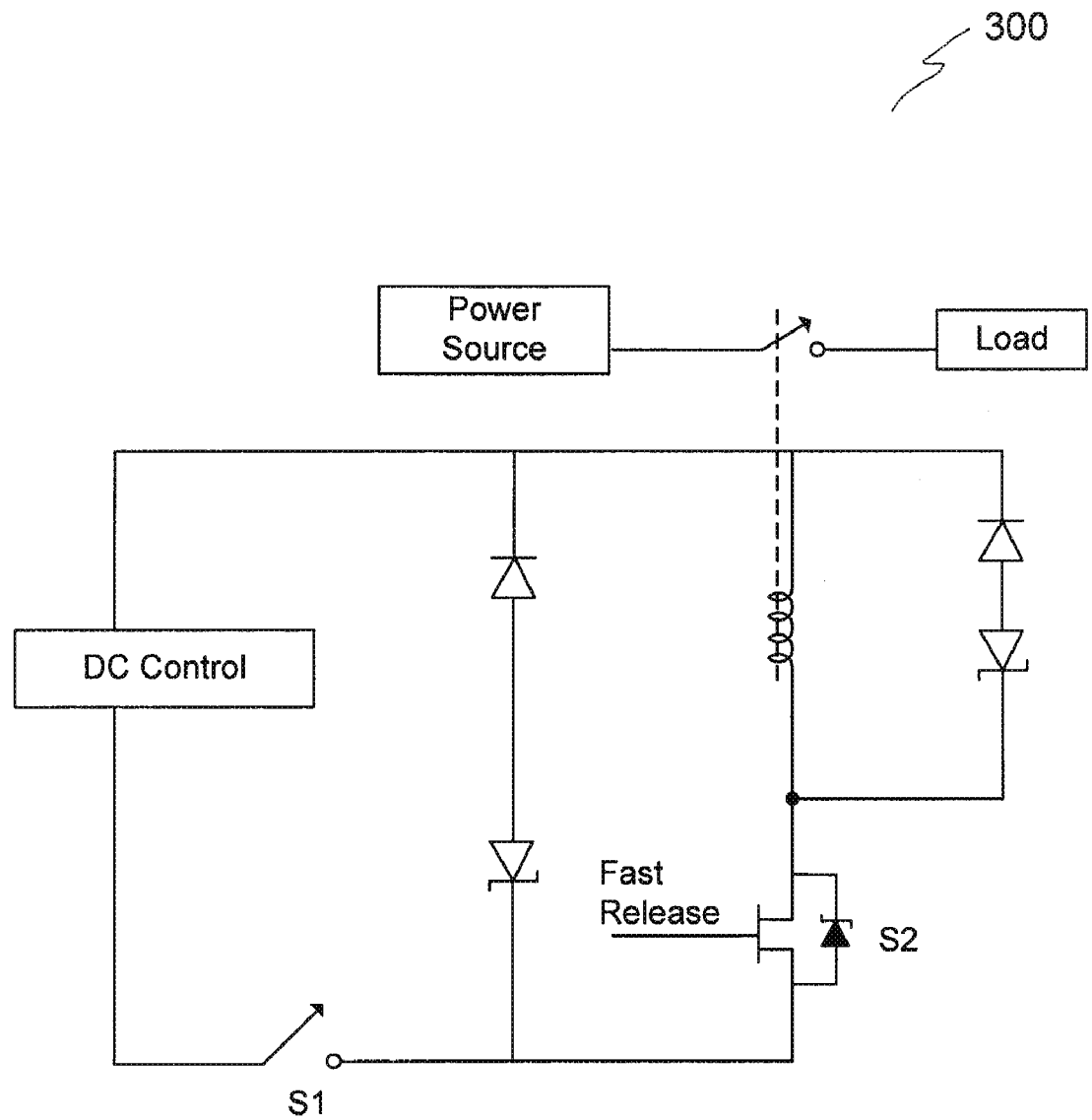
FIG. 3 is a schematic diagram of a DC relay circuit including a fast release circuit having a MOSFET switch in accordance with an embodiment of the present invention.

FIG. 3 is a schematic diagram of a DC relay circuit 300 including a fast release circuit having a MOSFET switch S2 in accordance with an embodiment of the present invention. The components of the DC relay circuit 300 are the same as those illustrated in FIG. 2 and described above, except that the second switch S2 is replaced with a MOSFET switch. The MOSFET switch S2, the DC control source and first switch can be controlled by an external control circuit (not illustrated). In several embodiments, the DC relay circuit and fast release circuit operate as described above for FIG. 2.

Figure 4:
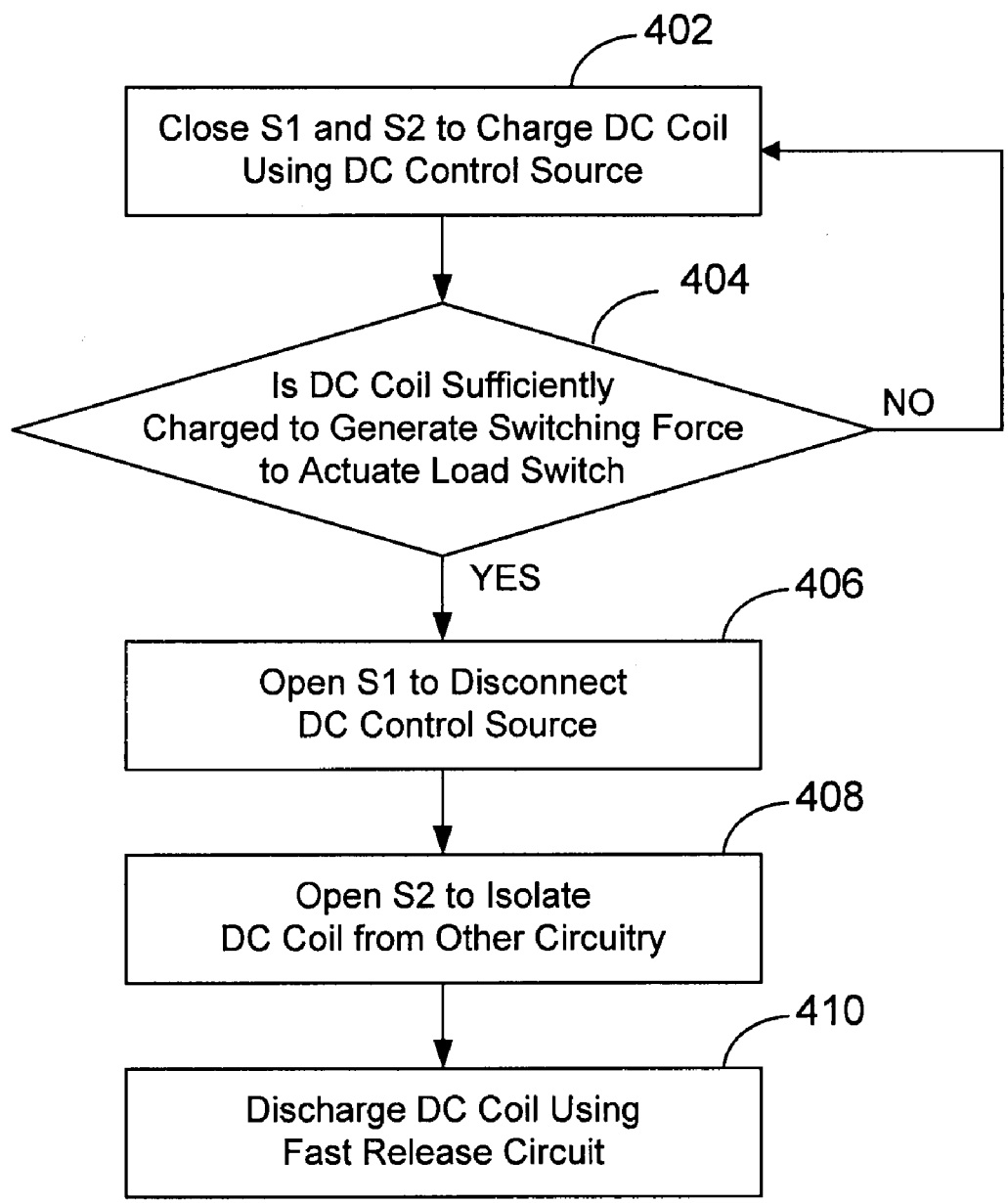
FIG. 4 is a flow chart of a process for operating a DC relay circuit having a fast release circuit in accordance with an embodiment of the present invention.

FIG. 4 is a flow chart of a process for operating a DC relay circuit having a fast release circuit in accordance with an embodiment of the present invention. In particular embodiments, the process is performed in conjunction with the fast release circuits of FIG. 2 or of FIG. 3. In block 402, the process begins by closing switch S1 and switch S2 to charge the DC coil using the DC control source. In block 404, the process determines whether the DC coil has been sufficiently charged as to generate the switching force necessary to actuate the load switch (or armature of the load switch). If the DC coil has not been sufficiently charged, then the process returns to block 402 and continues to charge the DC coil. If the DC coil has been sufficiently charged, then the process continues to block 406. In block 406, after the load switch has been actuated, the process opens switch S1 to disconnect the DC control source. In block 408, the process opens switch S2 to isolate the DC coil from other circuitry. In some embodiments, the other circuitry includes legacy circuitry. In a number of embodiments, a back voltage or back electromotive force (EMF) is generated by the DC coil in response to the sudden loss of current supplied by the DC control source. In block 410, the process discharges energy stored in the DC coil using the fast release circuit.

In the embodiment illustrated in FIG. 2, the fast release circuit includes the diode and zener diode in the back to back configuration. In a number of embodiments, if the back EMF generated DC coil is greater than the breakdown voltage of the zener diode, the zener diode operates in a reverse biased mode and permits a controlled amount of current to flow through the zener diode and thus through the conventional diode. In such case, both diodes dissipate energy as current flows through both diodes and returns to the DC coil. This dissipation cycle can repeat until the DC coil is fully discharged. In some embodiments, the DC coil is discharged in a single cycle. In several embodiments, the value of the zener diode, the zener or breakdown voltage, is chosen to enable a particular release time. For example, in one embodiment, use of a 200 volt zener diode for the second zener diode results in a release time of less than 10 ms.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

Figure 5:
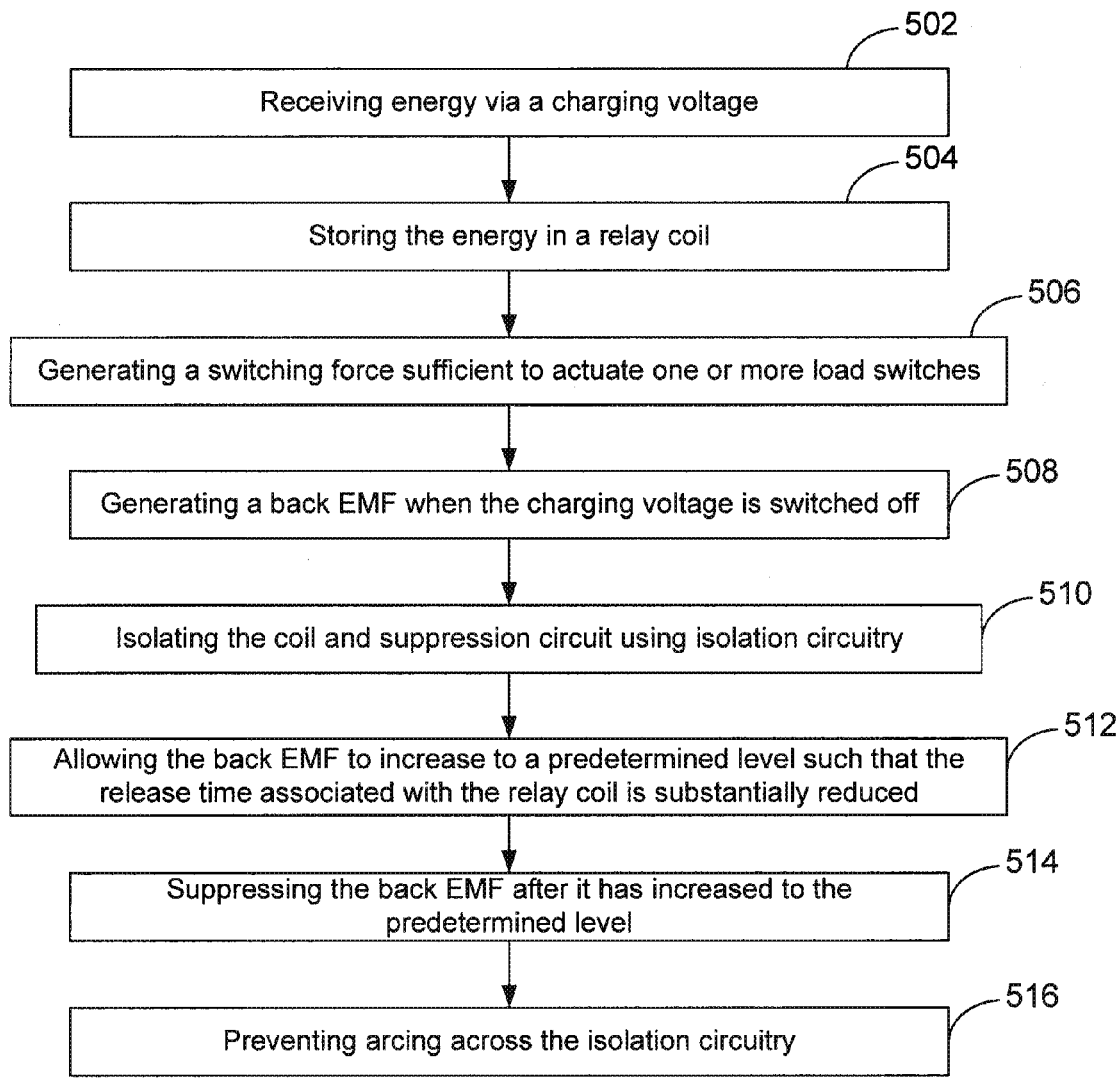
FIG. 5 is a flow chart of a sequence of actions performed by a DC relay circuit having a fast release circuit in accordance with an embodiment of the present invention.

FIG. 5 is a flow chart of a sequence of actions performed by a DC relay circuit having a fast release circuit in accordance with an embodiment of the present invention. In particular embodiments, the process is performed in conjunction with the fast release circuit of FIG. 2 or of FIG. 3. In block 502, the circuit receives energy via a charging voltage. In one embodiment, the charging voltage is provided by a DC control source. In block 504, the circuit stores the received energy in a DC coil. In block 506, the circuit generates a switching force sufficient to actuate one or more load switches. In block 508, the circuit generates a back EMF when the charging voltage is switched off. In several embodiments, the DC coil generates the back EMF. In block 510, the circuit isolates the coil and a suppression circuit using isolation circuitry. In block 512, the circuit allows the back EMF to increase to a predetermined level such that the release time associated with the relay coil is substantially reduced. In some embodiments, circuit decreases the release time for the DC relay by up to 50 percent. In block 514, the process suppresses the back EMF after it has increased to the predetermined level. In some embodiments, release time is reduced by allowing back EMF voltages to rise to a relatively high level when appropriately valued zener diodes and isolating switches are chosen for the circuit. In one embodiment, the predetermined level is 200 volts. In block 516, the circuit prevents arcing across the isolation circuitry. In one embodiment, the suppression circuit includes a conventional diode in series with a zener diode.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

FIG. 6 is a table illustrating performance characteristics associated with use of a fast release circuit in accordance with an embodiment of the present invention. The table illustrates a variety of both DC and AC type relays having fast release circuits. The table also illustrates release times for conventional relays not having a fast release circuit. For the DC relays having the fast release circuit, the release time can be improved (e.g. reduced) by up to 50 percent. For the AC relays having the fast release circuit, the release time can be improved (e.g. reduced) by up to 500 percent.

In a number of embodiments, additional characteristics of a DC relay having a fast release circuit are designed to accommodate a particular intended back EMF. For example, in several embodiments, the separation of traces on a printed circuit board of the DC relay is implemented such that arcing between traces at the intended back EMF is prevented. In other embodiments, the material and thickness of coating(s) applied to the DC coil are selected such that arcing between windings at the intended back EMF and/or damage to coatings based on the magnitude of the back EMF are prevented.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A circuit for discharging a relay coil, the circuit comprising:
   a first suppression circuit coupled across a control power source;
   a switch;
   a relay coil in series with the switch, wherein the relay coil and the switch are coupled across the control power source; and
   a second suppression circuit coupled across the relay coil;
   wherein the relay coil is configured to actuate at least one load switch when sufficiently energized by the control power source;
   wherein the first suppression circuit is configured to discharge energy stored in the relay coil; and
   wherein the second suppression circuit is configured to discharge energy stored in the relay coil.

2. The circuit of claim 1, wherein the switch is configured to isolate the relay coil and the second suppression circuit from the first suppression circuit.

3. The circuit of claim 1:
   wherein the first suppression circuit is configured to discharge energy stored in the relay coil when the switch is closed; and
   wherein the second suppression circuit is configured to discharge energy stored in the relay coil when the switch is open.

4. The circuit of claim 1:
   wherein the first suppression circuit is configured to discharge the energy stored in the relay coil in a first time period;
   wherein the second suppression circuit is configured to discharge the energy stored in the relay coil in a preselected time period; and
   wherein the first time period is greater than the preselected time period.

5. The circuit of claim 4, wherein the first time period is approximately twice as much as the preselected time period.

6. The circuit of claim 1, wherein the first suppression circuit is comprised of a zener diode in series with a diode.

7. The circuit of claim 6, wherein the second suppression circuit is comprised of a zener diode in series with a diode.

8. The circuit of claim 1:
   wherein the second suppression circuit is comprised of a zener diode in series with a diode; and
   wherein an anode of the diode is coupled to an anode of the zener diode.

9. The circuit of claim 1:
- wherein the second suppression circuit is comprised of a zener diode in series with a diode;
- wherein the switch has a preselected voltage limit; and
- wherein the zener diode has a breakdown voltage less than the preselected voltage limit of the switch.

10. The circuit of claim 9, wherein the switch is a MOSFET switch.

11. The circuit of claim 10, wherein the preselected voltage limit of the MOSFET switch is based on a characteristic of a body diode of the MOSFET switch.

12. The circuit of claim 9, wherein the preselected breakdown voltage is selected based on the preselected voltage limit of the switch and a preselected release time for a relay comprising the relay coil.

13. A circuit for discharging a relay coil, the circuit comprising:
- a control power source;
- a first switch in series with the control power source;
- a first parallel subcircuit in parallel with the control power source and the first switch, the first parallel subcircuit comprising a first diode in series with a first zener diode;
- a second parallel subcircuit in parallel with the control power source and the first switch, the second parallel subcircuit comprising a MOSFET switch in series with a relay coil; and
- a third parallel subcircuit in parallel with the relay coil, the third parallel subcircuit comprising a second diode in series with a second zener diode;
- wherein the relay coil is configured to actuate at least one load switch when sufficiently energized by the control power source.

14. The circuit of claim 13:
- wherein the first parallel subcircuit is configured to discharge energy stored in the relay coil when the MOSFET switch is closed; and
- wherein the third parallel subcircuit is configured to discharge energy stored in the relay coil when the MOSFET switch is open.

15. The circuit of claim 13, wherein the MOSFET switch is configured to isolate the relay coil and the second parallel subcircuit from the first parallel subcircuit.

16. The circuit of claim 13:
- wherein the first parallel subcircuit is configured to discharge energy stored in the relay coil in a first time period;
- wherein the third parallel subcircuit is configured to discharge energy stored in the relay coil in a preselected time period; and
- wherein the first time period is greater than the preselected time period.

17. The circuit of claim 16, wherein the first time period is approximately twice as much as the preselected time period.

18. The circuit of claim 13, wherein an anode of the second diode is coupled to an anode of the second zener diode.

19. The circuit of claim 13, wherein a cathode of the second diode is coupled to a cathode of the second zener diode.

20. The circuit of claim 13:
- wherein the MOSFET switch has a preselected voltage limit; and
- wherein a preselected breakdown voltage of the second zener diode is based on the preselected voltage limit of the MOSFET switch and a preselected release time for a relay comprising the relay coil.

21. The circuit of claim 20, wherein the breakdown voltage of the second zener diode is less than the preselected voltage limit of the MOSFET switch.

* * * * *